US011746942B2

(12) United States Patent
Durieux et al.

(10) Patent No.: US 11,746,942 B2
(45) Date of Patent: Sep. 5, 2023

(54) CONNECTION ASSEMBLY AND THERMOREGULATION ASSEMBLY

(71) Applicant: STAUBLI FAVERGES, Faverges-Seythenex (FR)

(72) Inventors: Christophe Durieux, Gilly sur Isere (FR); Frederic Morel, Lathuile (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/946,249

(22) Filed: Sep. 16, 2022

(65) Prior Publication Data

US 2023/0094260 A1    Mar. 30, 2023

(30) Foreign Application Priority Data

Sep. 24, 2021    (FR) ...................................... 2110074

(51) Int. Cl.
*F16L 37/52*    (2006.01)
*F16L 29/04*    (2006.01)
(Continued)

(52) U.S. Cl.
CPC .............. *F16L 37/52* (2013.01); *F16L 29/04* (2013.01); *F16L 37/56* (2013.01); *F16L 39/00* (2013.01); *F16L 29/02* (2013.01); *F28F 9/0253* (2013.01)

(58) Field of Classification Search
CPC . F16L 37/34; F16L 29/04; F16L 29/02; F16L 37/50; F16L 37/52; F16L 39/00;
(Continued)

(56) References Cited

U.S. PATENT DOCUMENTS

| 3,508,580 A | * | 4/1970 | Snyder, Jr. | ............... F16L 37/50 137/614.04 |
| 3,645,294 A | * | 2/1972 | Allread | ................... F16L 37/34 137/614 |

(Continued)

FOREIGN PATENT DOCUMENTS

| CN | 207112176 U | * | 3/2018 |
| EP | 2623916 A1 | | 8/2013 |

(Continued)

OTHER PUBLICATIONS

French Search Report For 2110074 dated May 5, 2022, 2 Pages.

*Primary Examiner* — David Colon-Morales (57) ABSTRACT

The connection assembly (100) which includes a flange (140) has two internal orifices (150) crossing through and centered on orifice axes (A150) parallel to each other, a front surface (142) and a rear surface (144) parallel to a transverse plane (P140) transverse to the orifice axes (A150), two fluidic coupling elements (170), that have a male body (172) received in a corresponding internal orifice, and a cover (120), configured for being attached to a support (110) in a mounted configuration of the connection assembly. The flange can move with respect to the cover according to a movement supported by the transverse plane, whereas for each male body, a second gasket (188) is interposed radially between the male body and an internal radial surface (S162) of the corresponding internal orifice, each male body being mounted in the corresponding internal orifice and can be tilted with respect to the corresponding orifice axis.

15 Claims, 8 Drawing Sheets

(51) Int. Cl.
  *F16L 37/56* (2006.01)
  *F16L 39/00* (2006.01)
  *F16L 29/02* (2006.01)
  *F28F 9/02* (2006.01)
(58) Field of Classification Search
  CPC ......... F16L 39/04; F16L 37/56; F28F 9/0253; H05K 7/20272; H05K 7/20772
  See application file for complete search history.

(56) References Cited

U.S. PATENT DOCUMENTS

| | | | |
|---|---|---|---|
| 4,171,559 A | 10/1979 | Cooke | |
| 4,886,301 A * | 12/1989 | Remsburg | F16L 37/56 |
| | | | 285/39 |
| 5,322,330 A * | 6/1994 | Remsburg | F16L 37/34 |
| | | | 285/39 |
| 5,354,103 A | 10/1994 | Torrence | |
| 8,028,718 B2 * | 10/2011 | Tiberghien | F16L 29/04 |
| | | | 251/149.6 |
| 9,194,634 B2 * | 11/2015 | Tiberghien | F16L 37/34 |
| 9,351,428 B2 * | 5/2016 | Eckberg | F16L 37/34 |
| 10,288,198 B2 * | 5/2019 | Tiberghien | H05K 7/20272 |
| 2004/0074541 A1 * | 4/2004 | Sharpe | F16L 37/121 |
| | | | 137/614.04 |
| 2013/0312846 A1 * | 11/2013 | Eriksen | H05K 7/20272 |
| | | | 137/315.01 |
| 2022/0349503 A1 * | 11/2022 | Durieux | F16L 37/02 |
| 2022/0412496 A1 * | 12/2022 | Nick | H05K 7/20772 |

FOREIGN PATENT DOCUMENTS

| | | | | |
|---|---|---|---|---|
| EP | 2966396 A1 * | 1/2016 | | B23P 15/26 |
| EP | 2966396 A1 | 1/2016 | | |
| WO | WO-2022180569 A1 * | 9/2022 | | |

* cited by examiner

CONNECTION ASSEMBLY AND THERMOREGULATION ASSEMBLY

The present invention relates to a connection assembly, and a thermoregulation assembly comprising such a connection assembly.

In the field of thermoregulation circuits designed for regulating the temperature of a heat exchange plate, e.g. in the field of cooling circuits designed for cooling a so-called "cold plate" heat exchange plate, it is known how to connect such a plate to a connection assembly, in order to establish a fluidic connection therebetween for establishing a thermoregulation fluidic flow. The connection assembly comprises at least two fluidic coupling elements, e.g. male elements, while the cold plate comprises at least two matching fluidic coupling elements, e.g. female elements, each matching coupling element being arranged for being coupled to a corresponding fluidic coupling element.

However, due to manufacturing and assembly tolerances, the coupling elements of the connection assembly and the matching elements of the heat exchange plate are generally not perfectly aligned, which increases the risk of sticking and/or the wear when connecting a connection assembly and the associated plate.

It is known how to provide a coupling element with lateral clearance for compensating for any misalignment of the coupling element when connecting to the matching coupling element.

Examples include:

EP-2 966 396-A1 describes, e.g., a connection assembly comprising two coupling elements mounted with a first clearance in a common flange, so as to compensate for any misalignment, the common flange being mounted in a support so as to leave space for a second lateral clearance over a large amplitude. However, such a connection assembly structure remains too bulky for certain uses, in particular when a center distance between two adjacent coupling elements is reduced, e.g. smaller than or equal to 25 mm, and there is an spacing fault between the coupling elements and the matching coupling elements.

U.S. Pat. No. 5,354,103-A describes a female connection device, configured for retaining male coupling elements, equipped with a radial retaining protrusion, via a snap plate, without any possibility of lateral clearance or tilting.

EP-2 623 916-A1 describes connection blocks comprising male coupling elements screwed into a plate, without any possibility of lateral clearance or tilting of the male elements.

U.S. Pat. No. 4,171,559-A describes a connection block designed for receiving male elements. The connection block comprises a locking plate, for fastening or disassembling male elements, without any possibility of lateral clearance or tilting of the male elements.

Such problems are more particularly addressed by the invention which proposes a connection assembly for compensating any misalignment and spacing fault, while remaining compact.

For this purpose, the invention relates to a connection assembly, configured for being coupled to a cold plate and comprising:

a flange with at least two internal orifices therethrough, each of which is centered on an orifice axis, the orifice axes being parallel to each other, the flange having a front surface oriented forward along a longitudinal direction parallel to the orifice axes and a rear surface oriented backward, the front and rear surfaces being parallel to a transverse plane, which is transverse to the orifice axes, a cover, configured for being attached to a support in a mounted configuration of the connection assembly, the support comprising piping outlets, each piping outlet being associated with a corresponding internal orifice, wherein:

in the mounted configuration of the connection assembly, the rear surface of the flange is located opposite a front face of the support along the longitudinal direction, while the front surface of the flange is located opposite a rear surface of the cover along the longitudinal direction, each internal orifice comprises a rear opening, which opens onto the rear surface of the flange and is in fluidic communication with the corresponding piping outlet, the connection assembly further comprises:

first gaskets, which, in the mounted configuration of the connection assembly, are interposed between the rear surface of the flange and the front face of the opposite support, each first gasket surrounding a corresponding piping outlet and the associated rear opening, at least two fluidic coupling elements, each fluidic coupling element comprising a male body having an internal piping therethrough, each male body comprising a tubular front portion and a rear portion, each rear portion is received in a corresponding internal orifice of the flange, whereas each tubular front portion extends over the front of the flange through an opening in the cover, each male body being configured for abutting onto the front against the flange, each tubular front portion is configured for being coupled to a matching fluidic coupling element belonging to the plate.

the internal piping of each male body is in permanent fluidic communication with the rear opening of the corresponding internal orifice.

According to the invention:

in the mounted configuration of the connection assembly, the flange is movable with respect to the cover only following a movement supported by the transverse plane, for each male body, the connection assembly comprises a second gasket, which is interposed radially between each male body and an internal radial surface of the corresponding internal orifice, each male body is mounted in the corresponding internal orifice and can be tilted with respect to the corresponding orifice axis.

According to the invention, the connection assembly comprises, for each fluidic coupling element, both a first compensation device for lateral clearance, in all the directions supported by the transverse plane, and a second compensation device, decoupled from the first compensation device, for an angular clearance of each coupling element in the flange, such a structure being particularly compact.

According to advantageous but not necessary aspects of the invention, such a connection assembly can incorporate one or more of the following features taken individually or in any technically acceptable combination:

In the uncoupled configuration, each male body can move into the corresponding internal orifice of the flange along the corresponding orifice axis.

For each male body, an internal axial surface of the flange which delimits the corresponding internal orifice is located opposite the front of a rear surface of the male body.

The rear portion of each male body comprises an external collar protruding with respect to the tubular front portion along a direction radial to a central axis of the corresponding male body, whereas each second gasket is interposed radially between the flange and the corresponding external collar.

The flange comprises at least a rear body and a front body, which are housed one inside the other, the rear body delimiting the rear opening of the internal orifice, the front body delimiting the front surface of the flange, the external collar of the male body being mounted along the orifice axis between the front body and the rear body.

Each first gasket is interposed longitudinally between a surface of the rear body delimiting the rear surface of the flange and the support, each first gasket preferentially being housed in a corresponding groove provided in the rear body.

Each second gasket is interposed radially between an internal radial surface of the internal orifice formed on the rear body of the flange and the external collar, each second gasket preferentially being housed in a corresponding external peripheral groove of the external collar.

The flange comprises at least one rear body per fluidic coupling element, each rear body being housed in a corresponding cylindrical cavity provided in the front body of the flange.

The internal orifice comprises a first volume delimited by a first radial internal surface of the flange, partially housing the tubular front portion and leading forward to the front surface of the flange and backward to a second volume of the internal orifice, the second volume being delimited by a second internal radial surface of the flange and housing the external collar, while a length of the first internal radial surface is greater than a length of the second internal radial surface.

Each fluidic coupling element comprises:
- a valve which can move inside the internal piping with respect to the male body,
- a spring, housed in the internal piping and which pushes the valve back into a closing position of the internal piping, wherein the valve is in leak-tight contact with the tubular front portion and closes the internal piping, and
- an interface ring, received in the internal piping,
- whereas, in the mounted configuration of the connection assembly, the spring is resting at the rear on the interface ring which itself rests at the rear against the flange.

The rear opening diverges backwards from the orifice axis of the corresponding internal orifice.

In the mounted configuration of the connection assembly, a minimum distance between two adjacent first gaskets is greater than a maximum clearance of the flange with respect to the cover along a direction parallel to the transverse plane.

In the uncoupled configuration, each second gasket returns the corresponding male body into a position wherein a central axis of the male body is substantially aligned with the corresponding orifice axis.

The cover comprises:
- a skirt which delimits a housing for receiving the flange radially to the longitudinal direction, and
- a front wall, which comprises at least as many openings as the connection assembly comprises tubular front portions.

The invention further relates to a thermoregulation assembly, in particular for cooling, comprising:
- a support wherein at least two piping outlets are provided,
- a connection assembly as described above, the cover being attached to the support in the mounted configuration of the connection assembly, and
- a plate having attached thereto, at least two matching coupling elements, each configured for mating with a corresponding fluidic coupling element of the connection assembly.

The invention will be better understood, and other advantages thereof will become more clearly apparent in the light of the following description of three embodiments of a connection assembly and a thermoregulation assembly, in accordance with the principle thereof, given only as an example and with reference to the enclosed drawings, wherein.

Figure 1:
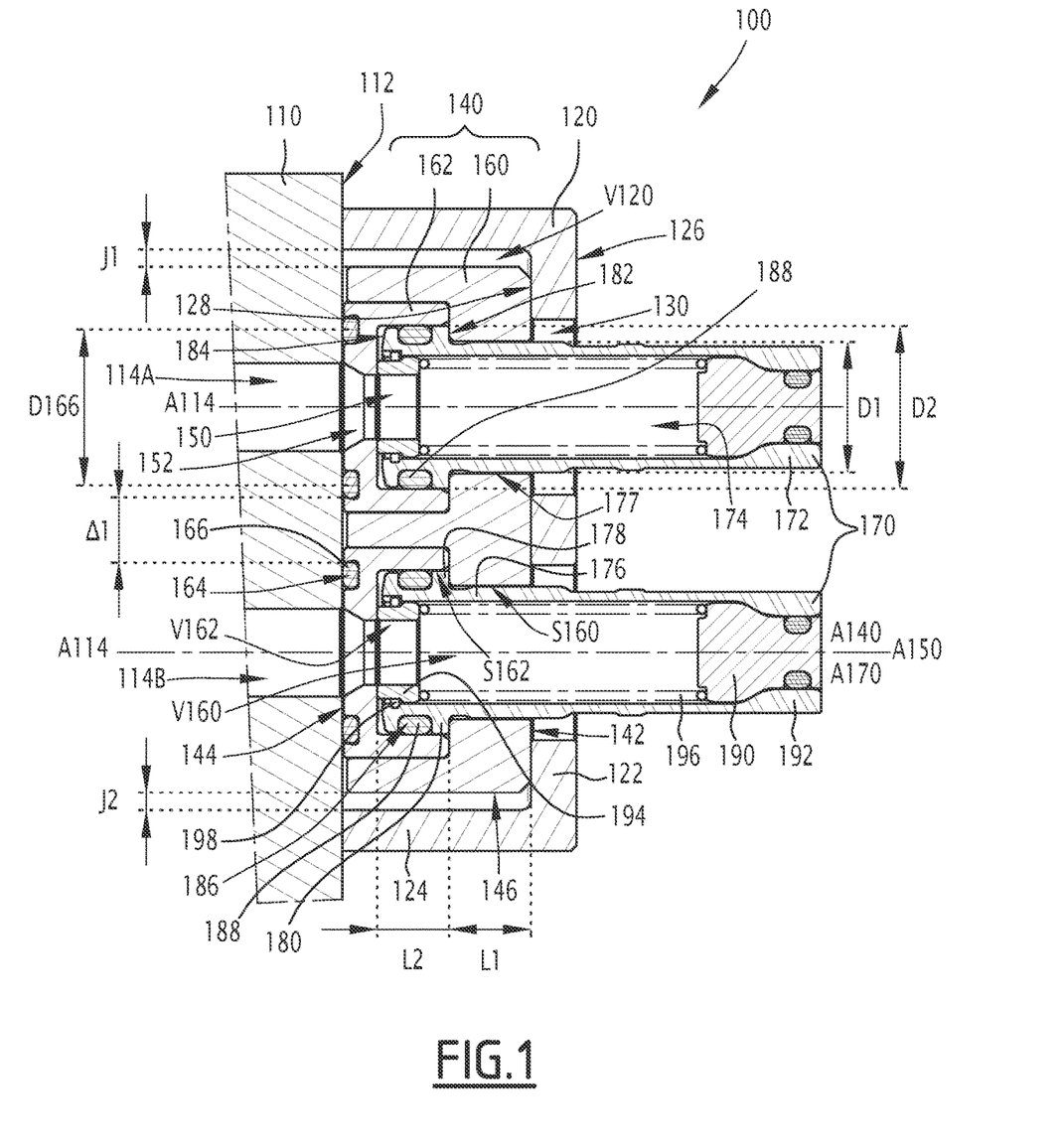
FIG. 1 is a longitudinal section of a connection assembly according to a first embodiment of the invention, shown in an uncoupled configuration.
Figure 2:
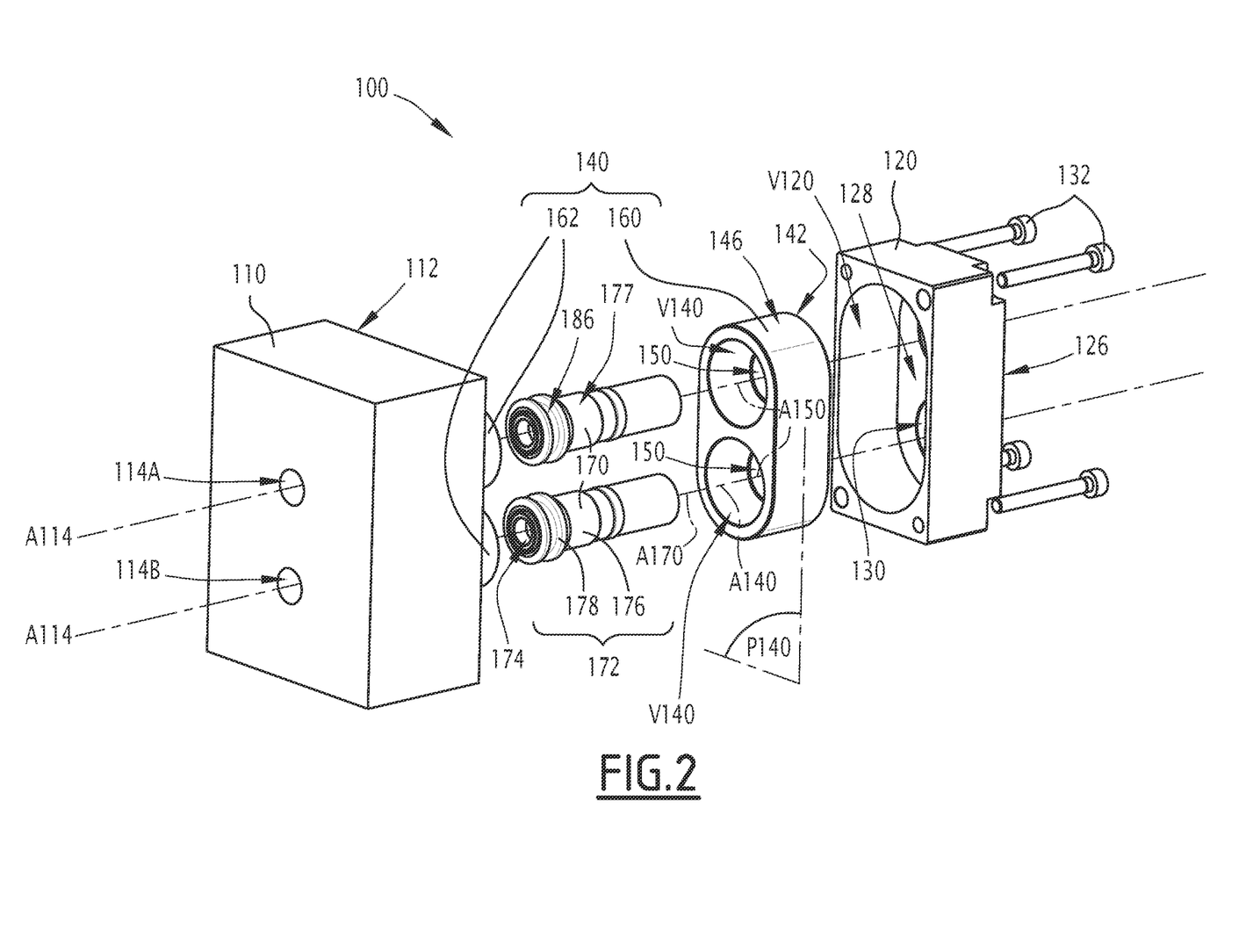
FIG. 2 is a perspective view of an exploded view of the connection assembly shown in FIG. 1, some elements being omitted so as to make the reading easier.

A connection assembly 100 is shown in cross-sectional view in FIG. 1, and in an exploded view in FIG. 2. The connection assembly 100 is shown here in a configuration mounted on a support 110, which is not part of the connection assembly 100, but which contributes to the implementation thereof.

The support 110 comprises a front face 112 which is considered to be flat. Hereinafter in the description of the connection assembly 100 or of the support 110, the "front" or "rear" directions are given with reference to a longitudinal axis, the front or "forward" longitudinal direction being oriented in a direction of coupling of the connection assembly 100 with a plate 300. The plate 300 is described later in the description. The rear or "backwards" longitudinal direction is opposite to the front longitudinal direction. With reference to the drawings, the front longitudinal direction is oriented to the right of the drawings, knowing that, in reality, this could be otherwise. A so-called "front" surface of the connection assembly 100 or of the support 110 is oriented along the front longitudinal direction while a so-called "rear" surface is oriented along the rear longitudinal direction.

The support 110 comprises a piping, which is provided in the support 110 and which comes out at the front face 112 via two piping outlets 114A and 114B. Each piping outlet 114A or 114B has herein a cylindrical shape with a circular cross-section centered on an outlet axis A114, which is perpendicular to the front face 112. In other words, the outlet axes A114 associated with the piping outlets 114A and 114B are parallel to each other.

The connection assembly 100 further comprises a cover 120 and a flange 140.

The cover 120 is configured for being attached to the support 110 in the mounted configuration of the connection assembly 100, wherein the cover 120 forms with the support 110, a receiving housing V120 for the flange 140.

In the first embodiment of the invention, the cover 120 has an overall parallelepipedal shape, with a front wall 122 of rectangular shape and a skirt 124.

The front wall 122 is flat overall and comprises a front surface 126 and a rear surface 128 opposite the front surface 126. In the mounted configuration of the connection assembly 100, the rear surface 128 is oriented toward the support 110 and parallel to the front face 112 of the support 110. The skirt 124 extends at a periphery of the front wall 122 on the side of the rear surface 128. The receiving housing V120 here has a cylindrical shape with oblong cross-section centered on an axis orthogonal to the front wall 122.

Openings 130, herein two in number, are provided through the front wall 122, connecting the front surface 126 to the rear surface 128. In other words, the receiving housing V120 comes out onto the front surface 126 via the openings 130. In the mounted configuration of the connection assembly, each opening 130 is aligned with a corresponding outlet axis A114, whereas the piping outlets 114A and 114B come out to the receiving housing V120. In the example shown, the cover 120 is attached to the support 110 by means of four fastening screws 132. In general, the cover 120 is attached to the support 110 without any possibility of movement with respect to the support 110.

The flange 140 comprises a front surface 142, a rear surface 144 oriented opposite to the front surface, and an external peripheral surface 146, which connects the front surface 142 to the rear surface 144. The front 142 and rear 144 surfaces are flat herein, parallel to each other and orthogonal to a longitudinal axis A140 of the flange 140. The external peripheral surface 146 delimits the flange 140 along a direction radial to the longitudinal axis A140. The front 142 and rear 144 surfaces extend parallel to a transverse plane P140, which is transverse to the longitudinal axis A140, in particular radial to the longitudinal axis A140, i.e. orthogonal to the longitudinal axis A140. The flange 140 has herein an overall cylindrical external shape with oblong cross-section taken in the transverse plane P140 and extending along the longitudinal axis A140.

In the mounted configuration of the connection assembly 100, the flange 140 is received in the receiving housing V120, the rear surface 144 of the flange 140 being situated opposite the rear of the front face 112 of the support 110 along a longitudinal direction, i.e. in a direction parallel to the longitudinal axis A140, whereas the front surface 142 of the flange 140 is situated opposite the front the rear surface 128 of the cover 120 along the longitudinal direction. In the mounted configuration of the connection assembly 100, the skirt 124 delimits, radially to the longitudinal direction, the receiving housing V120, whereas parallel to the longitudinal axis A140, the receiving housing V120 is delimited between the front face 112 of the support 110 and the rear surface 128 of the front wall 122 of the cover 120. The longitudinal axis A140 of the flange 140 is parallel herein to the outlet axes A114.

The front face 112 of the support 110 is thus parallel to the rear surface 128 of the cover 120, the flange 140 being sandwiched between the front face 112 of the support 110 and the rear surface 128 of the cover 120. A clearance is provided around the flange 140 between the external peripheral surface 146 and the skirt 124, longitudinally between the flange 140 and the cover 120 and longitudinally between the flange 140 and the support 110, so that in the mounted configuration of the connection assembly 100, the flange 140 can be moved with respect to the cover 120 only in a movement supported by the transverse plane P140. Such movement can be a translational movement, in any direction parallel to the transverse plane P140, as well as a rotational movement about an axis of rotation parallel to the longitudinal axis A140. Translation and rotation movements can be combined. Such movements are limited when the flange 140 abuts against the skirt 140.

Figure 3:
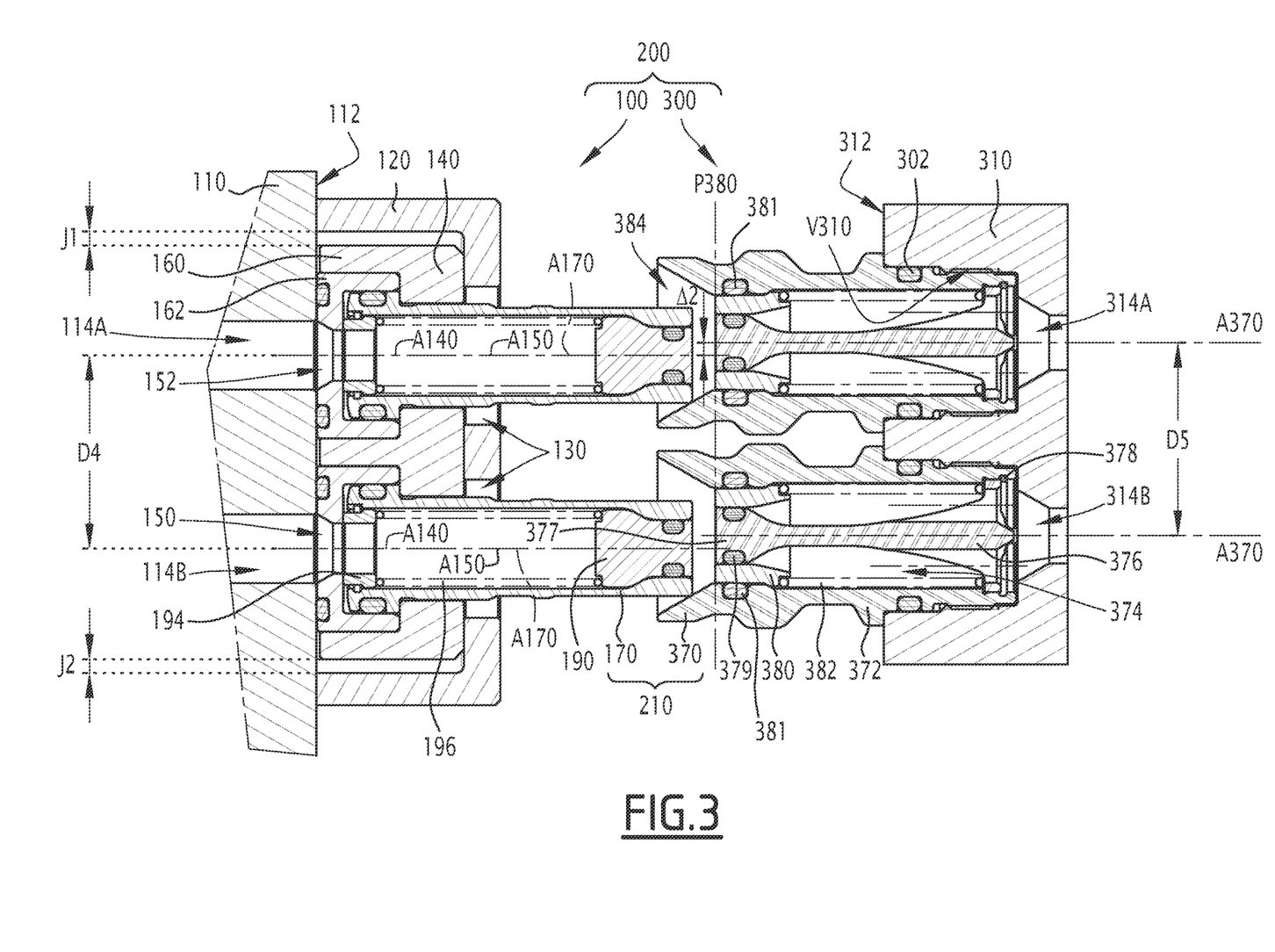
FIG. 3 is a longitudinal section of a thermoregulation assembly according to the invention, shown in a configuration during coupling and comprising the connection assembly shown in FIG. 1 and a matching assembly.

In FIGS. 1 and 3, the flange 140 is shown in a so-called "neutral" position, wherein the flange 140 is centered in the receiving housing V120. The flange 140 and the receiving volume V120 are preferentially designed in such a way that, in the neutral position, a distance taken parallel to the transverse plane P140 between any point of the external peripheral surface 146 and the skirt 124 opposite this point, is constant. In other words, the clearance between the external peripheral surface 146 and the skirt 124 is constant all around the flange 140.

The flange 140 delimits two internal orifices 150, which each cross through the flange 140 and which are each orifices of revolution, centered on an orifice axis A150. The orifice axes A150 are parallel to each other and cross through the transverse plane P140, i.e. the transverse plane P140 is also transverse to the orifice axes A150. The "front" or "rear" directions given with reference to the longitudinal axis A140 are thus equivalent to the forward or backward directions given with reference to the orifice axes A150. The front surface 142 is thus oriented forwards along a longitudinal direction parallel to the orifice axes A150, whereas the rear surface 144 is oriented backwards along a longitudinal direction parallel to the orifice axes A150. In the example shown, the orifice axes A150 are parallel to the longitudinal axis A140, i.e. orthogonal to the transverse plane P140.

Each internal orifice 150 opens onto the rear surface 144 of the flange 140 via a rear opening 152. Advantageously, each rear opening 152 diverges backwards from the orifice axis A150 of the corresponding internal orifice 150, each rear opening 152 herein having a frustoconical shape. In the mounted configuration of the connection assembly 100, each rear opening 152 is arranged opposite a corresponding piping outlet 114A or 114B parallel to the longitudinal axis A140. In other words, each rear opening 152 is in fluidic communication with the corresponding piping outlet 114A or 114B. More generally, each internal orifice 150 is in fluidic communication backwards with a corresponding piping outlet 114A or 114B, and forwards with an opening 130.

In the first embodiment of the invention, the flange 140 is made of a plurality of parts assembled together. Herein, the flange 140 comprises a front body 160 and two rear bodies 162, each rear body mating with the front body 160 by engagement so as to form a corresponding internal orifice 150. Herein, each rear body 162 is housed in a corresponding cylindrical cavity V140 provided in the front body 160 of the flange 140. The front body 160 and the rear bodies 162 are thus simple to produce, e.g. by machining.

The front body 160 comprises the front surface 142 of the flange 140, whereas each rear body 162 comprises a portion of the rear surface 144 of the flange 140.

The front body 160 delimits a first volume V160 of each internal orifice 150, which comes out to the front surface 142. Each first volume V160 has a cylindrical shape of circular cross-section, with a diameter D1, and is delimited by a first internal radial surface S160, with a diameter D1, centered on the corresponding orifice axis A150 and having a length L1, measured parallel to the orifice axis A150.

For each internal orifice 150, the corresponding rear body 162 comprises a first internal axial surface 163, which is oriented forward, which is perpendicular to the orifice axis 150 and which delimits longitudinally, a second volume V162 of the internal orifice 150, into which the first volume V160 comes out backwards. The second volume V162 is delimited longitudinally forward by a second internal axial surface 163' which is provided on the front body 160, perpendicular to the orifice axis 150 and oriented backwards.

Towards the rear, each second volume V162 opens into a rear opening 152. Each second volume V162 has a cylindrical shape of circular cross-section, with a diameter D2, and is delimited by a second internal radial surface S162, with a diameter D2, centered on the corresponding orifice axis A150 and having a length L2, measured parallel to the orifice axis A150. The length L2 further corresponds to the length taken parallel to the orifice axis A150 between the first internal axial surface 163 and the second internal axial surface 163'. The diameter D2 of the second volume V162 is greater than the diameter D1 of the first volume V160.

On each rear body 162, the rear surface 144 comprises a rear groove 164, recessed in the rear surface 144 and having a closed circular contour centered on the corresponding orifice axis A150. Each rear groove 164 houses a first gasket 166, herein an O-ring. In the figures, the first gaskets 166 are shown compressed against the flange 140 and the support 110. Each first gasket 166 has a mean diameter D166.

Preferentially, the mean diameter D166 is equal, to within ±20%, to the diameter D2 of the corresponding second radial internal surface S162, which allows a more compact connection assembly 100 to be produced.

In the mounted configuration of the connection assembly 100, regardless of the radial position of the flange 140 with respect to the cover 120 and to the support 110, each first gasket 166 is interposed longitudinally between the flange 140 and the support 110 and surrounds, in a leak-tight manner, the rear opening 152 of the corresponding internal orifice 150 and the corresponding piping outlet 114A or 114B. In other words, each first gasket 166 isolates the internal piping 150 and the associated piping of the support 110, from the receiving housing V120. Each rear opening 152 is thus in permanent fluidic communication with the corresponding piping outlet 114A or 114B.

A minimum distance Δ1 between the two first gaskets 166 is defined as the smallest length, measured parallel to the transverse plane P140, between the two rear grooves 164.

In FIGS. 1 and 3, the flange 140 is shown in a so-called "neutral" position, wherein the flange 140 is centered in the receiving housing V120. The flange 140 and the receiving volume V120 are designed in such a way that, in the neutral position of the flange 140, the clearance between the external peripheral surface 146 and the skirt 124 is substantially uniform all around the flange 140. In the top of FIG. 1, a first minimum clearance J1 is defined between the external peripheral surface 146 and the opposite skirt 124, whereas at the bottom of FIG. 1, at the top of FIG. 1, a second minimum clearance J2 is defined between the external peripheral surface 146 and the opposite skirt 124. The clearances J1 and J2 are taken parallel to the transverse plane P140. The sum of the first and second clearances J1+J2 represents a maximum clearance of the flange 140 in the receiving housing V120 with respect to the cover 120, along a direction parallel to the transverse plane P140.

Figure 4:
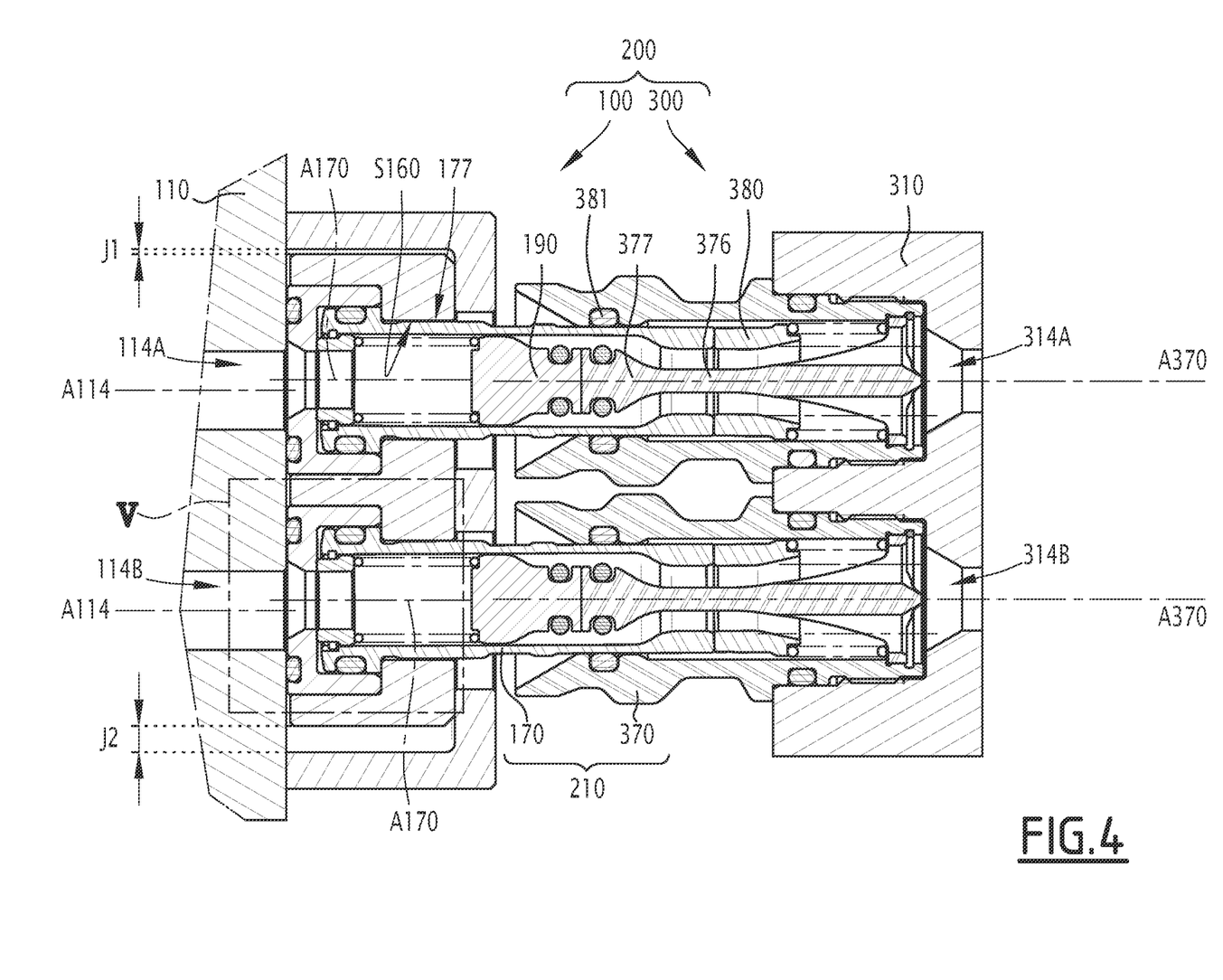
FIG. 4 is a longitudinal section of the thermoregulation assembly of FIG. 3, shown in a coupled configuration.

In FIGS. 1 and 3, the flange 140 is in the neutral position and the first and second clearances J1 and J2 are equal. In FIG. 4, the flange 140 is offset with respect to the neutral position thereof, and the first and second clearances J1 and J2 are not equal.

Advantageously, the minimum distance Δ1 between the two adjacent first gaskets 166 is greater than the sum of the first and second clearances J1+J2, in other words greater than the maximum clearance of the flange 140 with respect to the cover 120 in a direction parallel to the transverse plane P140. In this way, the overlapping of the surfaces swept by the first gaskets 166 is prevented during the movements of the flange 140 with respect to the support 110, which prevents the surfaces from being polluted by the fluids of the piping outlets 114A and 114B. Different fluids can thus flow in each of the piping outlets 114A or 114B.

The connection assembly 100 further comprises two fluidic coupling elements 170. Each fluidic coupling element 170 comprises a male body 172, which has herein a hollow shape of revolution about a central axis, called the male body axis A170. The male body 172 is crossed right through by an internal piping 174 centered on the male body axis A170.

Each male body 172 comprises a tubular front part 176 with an external radial surface 177, centered on the male body axis A170, and a rear part 178, arranged opposite the tubular front part 176 along the male body axis A170.

In the mounted configuration of the connection assembly 100, each internal orifice 150 receives a corresponding fluidic coupling element 170. Each rear part 178 is received in a corresponding internal orifice 150, whereas each tubular front part 176 is partially received in the internal orifice 150 and extends over the front of the flange 140 and beyond the front surface 126 of the cover 120, out from the internal orifice 150 and from the receiving housing V120, through a corresponding opening 130 of the cover 120. Thus, the cover 120 comprises at least as many openings 130 as the connection assembly comprises tubular front parts 176. More precisely, the rear part 178 is received in a corresponding second volume V162, the internal piping 174 of each male body 172 thus being permanently in fluidic communication with the rear opening 152 of the corresponding internal orifice 150, whereas each tubular front part 176 crosses through the first volume V160 and extends over the front of the flange 140, each tubular front part 176 being configured for being coupled with a matching fluidic coupling element, as described below.

Each male body 172 is configured for abutting, on the front, against the flange 140. For this purpose, the rear part 178 of each male body 172 comprises an external collar 180 which protrudes with respect to the corresponding tubular front part 176 along a direction radial to the male body axis A170 of the corresponding male body 172. Each external collar 180 is housed in a corresponding second volume V162. Each external flange 180 comprises a front surface 182 and a rear surface 184 opposite the front surface 182.

In the mounted configuration of the connection assembly, for each external collar 180, the front surface 182 is arranged opposite the front body 160 along the front longitudinal direction. The rear surface 184 of the external collar 180 is arranged opposite, along the rear longitudinal direction, the rear body 162. In other words, the male body 172 is retained in the flange 140 in the forward longitudinal direction. More precisely, for each male body 172, the corresponding first internal axial surface 163 of the flange 140 is situated opposite the front of the rear surface 184 of the male body 172. In other words, each external collar 180 is mounted along the axis of the corresponding orifice 150 between the front body 160 and a corresponding rear body 162 of the flange 140. In the mounted configuration of the connection assembly, in the uncoupled configuration, each male body 172 can move inside the corresponding internal orifice 150 of the flange along the corresponding orifice axis A150. Indeed, the length L2 of the volume V162 is greater than a length L3 taken parallel to the orifice axis A150 between the front surface 182 and the rear surface 184 of the male body 172. In the uncoupled configuration, a spring 196 of the fluidic coupling element 170 pushes back the front surface 182 into surface abutment against the second internal axial surface 163', whereas there is a longitudinal clearance between the rear surface 184 of the male body 172 and the first internal axial surface 163 all around the orifice axis A150. The rear surface 184 is apt to rest backwards against the first internal axial surface 163.

An external peripheral groove 186 is recessed in an external radial surface 187 of each external collar 180, each external peripheral groove 186 being centered on the male body axis A170 and being configured for receiving a second gasket 188, herein an O-ring. For each external flange 180, the external radial surface 187 is situated radially opposite a corresponding second internal radial surface S162. In the mounted configuration of the coupling element 170 in the flange 140, a second gasket 188 is interposed radially to the axis of the orifice axis A150, in compression and in a leak-tight manner, between each male body 172 and the second radial internal surface S162 of the flange 140, precisely between each external collar 180 and the second internal radial surface S162.

Each male body 172 is received with assembly clearance in the corresponding internal orifice 150 so that the male body 172 can be tilted with respect to the corresponding orifice axis A150. The possibility of being tilted corresponds to a movement of the male body 172 in the internal orifice 150, with an elastic deformation of the second gasket 188.

In the uncoupled configuration of the connection assembly 100, the male body 172 is in a so-called "neutral" position in the corresponding internal orifice 150. In the neutral position, the corresponding male body axis A170 is substantially aligned with the corresponding orifice axis A150 and a flip angle α of the male body axis A170 relative to the orifice axis A150 is equal to zero.

When the flip angle α is not zero, the second gasket 188 is locally more compressed than in the neutral position of the male body 172, and the elastic return of the second gasket 188 tends to return the male body 172 to the neutral position thereof. It is understood that the maximum amplitude of the flip angle α depends on the geometry of the parts and the assembly clearances which are present when the connection assembly 100 is in the uncoupled configuration. E.g., the maximum amplitude of the flip angle α depends on the radial clearances between the external radial surface 177 of the tubular front part 176 and the first internal radial surface S160 of the flange 140 which is radially opposite the longitudinal axis A140, and/or depends on the radial clearances between the external radial surface 187 of the external collar 180 and the second internal radial surface S162 of the flange 140 which is radially opposite, and/or depends on the longitudinal clearances between the external collar 180 and the flange 140. The radial and longitudinal clearances between the male body 172 and the flange 140 are present all around the male body 172 in the neutral position so as to allow the male body 172 to adapt the position thereof in all directions about the orifice axis A150.

In practice, in a tilted configuration with respect to the neutral position thereof, the body axis A170 intersects the corresponding orifice axis A150 at the associated gasket 188 along the orifice axis A150.

Preferentially, the length L1 of the first internal radial surface S160 is greater than the length L2 of the second internal radial surface S162, in order to limit the maximum amplitude of the flip angle α, preferentially 10% greater than the length L2 of the second internal radial surface S162. In practice, but not necessarily, the maximum amplitude of the flip angle α is less than 1°—1 degree—.

Each fluidic coupling element 170 further comprises a valve 190 which is received in the internal piping 174 and which can move, with respect to the male body 172, between an advanced closing position, wherein the valve 190 is in front abutment against an internal shoulder 192 of the tubular front part 176 and closes the internal piping 174 in a leak-tight manner, and a retracted opening position, wherein the valve 190 does not prevent the fluidic flow in the internal piping 174. The valve 190 is shown in the forward closing position in FIGS. 1 and 3 and in the backward opening position in FIG. 4.

Each fluidic coupling element 170 further comprises an interface ring 194, which is received in the internal piping 174, and the spring 196, which is interposed between the valve 190 and the interface ring 194 for pushing back the valve 190 toward the advanced closing position thereof.

In the mounted configuration of the fluidic coupling element 170 in the flange 140, the interface ring 194 rests at the back against the flange 140 and the spring 196 rests on the interface ring 194. More precisely, the interface ring 194 rests herein on the rear body 162 of the flange 140. When fitting the coupling element 170 into the flange 140, before fitting the rear body 162 into the front body 160, the interface ring 194 is retained on the rear by a stop segment 198, which prevents the interface ring 194 from coming out backwards from the internal piping 174.

Due to the rear body 162 of the flange 140, the risks of the rear part 178 of the male body 172 or of the interface ring 194 coming into contact with the front face 112 of the support 110 are eliminated: damage is prevented to the sealing surface on which the first gasket 166 slides, which reduces the risk of leaks.

Advantageously, the force exerted by each spring 196 on the rear body 162 of the flange 140, by means of the corresponding interface ring 194, contributes to returning the corresponding coupling element 170 to the neutral position thereof with respect to the corresponding internal orifice 150, with the male body axis A170 merged with the corresponding orifice axis A150, in an uncoupled configuration.

The interface ring 194 has an internal diameter, which is preferentially equal to a minimum internal diameter of the rear opening 152 of the internal orifice 150, so as not to hinder the flow of the fluids along the internal piping 174.

A thermoregulation assembly 200 is shown in FIG. 3. The thermoregulation assembly 200 comprises the connection assembly 100, mounted on the support 110, and the plate 300, which comprises matching coupling elements 370, which are each configured for coupling to a corresponding coupling element 170 of the connection assembly 100. The plate 300 thus comprises herein, two matching coupling elements 370. In the example shown, the thermoregulation assembly 200 is configured for the flow of a cooling fluid, so the thermoregulation assembly 200 is herein a cooling assembly, whereas the plate 300 is also called a "cold plate".

In a variant (not shown), the thermoregulation assembly 200 is intended for the flow of a hot fluid, e.g. for heating an injection mold mounted on the plate 300.

In general, it will be understood that the implementation of the invention is independent of the temperature of the fluid which flows through the connection assembly 100 and the thermoregulation assembly 200.

When the plate 300 is connected to the connection assembly 100, the plate 300 is set opposite the connection assembly 100. The front and rear directions with respect to the plate 300 are thus reversed with respect to the connection assembly 100. In FIGS. 3 and 4, the front of the plate 300 is located on the left in the drawings.

The plate 300 comprises a support 310, with a front face 312, oriented toward the front face 112 of the support 110 during the connection of the plate 300 to the connection assembly 100. The support 310 comprises herein two tapped housings V310, of cylindrical shape centered along an axis orthogonal to the front face 312 of the support 310. The support 310 comprises a piping, which is provided in the support 310 and which comes out from a bottom of each tapped housing V310 via two corresponding piping outlets 314A and 314B. Each piping outlet 314A or 314B has herein a frustoconical portion flared toward the front face 312.

The fluidic coupling elements 170 of the connection assembly 100 are herein male elements with a male body 172, the matching coupling elements 370 are herein female elements. Each matching coupling element 370 comprises a female body 372, which has herein a hollow form of revolution about a female body axis A370 and which is screwed into a corresponding tapped housing V310 in a leak-tight manner, herein with a radial interposition of a gasket 302.

Each female body 372 delimits an internal piping 374 which communicates fluidically with a corresponding piping outlet 314A or 314B of the support 310. Each matching coupling element 370 further comprises a pusher 376 housed in the corresponding internal piping 374, each pusher 376 being rigidly attached in translation to the corresponding female body 372 by a stop segment 378, situated herein at a rear end of the pusher. Each pusher 376 comprises, at a front end opposite the rear end, a front part 377 forming a bulge wherein a gasket 379 is housed.

Each female body 372 further comprises an annular slide valve 380 which is placed radially to the female body axis A370, inside the internal piping 374, between the pusher 376 and the female body 372. Each slider 380 can be moved inside the internal piping 374 between an advanced position for closing the internal piping 374, wherein the slider 380 is in leak-tight contact with the female body 372 via a gasket 381 and with the front part 377 of the pusher 376, by means of the gasket 379 which closes the internal piping 374 in a leak-tight manner, and a retracted position for opening the internal piping 374, wherein the slider 380 does not prevent fluidic flow inside the internal piping 374.

Each female body 372 further comprises a spring 382, which is interposed between the corresponding slider 380 and the pusher 376, each spring 382 pushing the slider 380 toward the advanced closing position thereof. The slider 380 and the front part 377 of the pusher 376 each have a front face which is situated in the same front plane P380 when the slider 380 is in the advanced closing position. Each female body 372 comprises a flared opening, herein a conical opening 384, which is placed in front of the front plane P380.

A sequence for coupling the plate 300 to the connection assembly 100 is described below.

The plate 300 is brought close to the connection assembly 100, parallel to the longitudinal axis A140, each conical opening 384 being placed opposite a corresponding tubular front part 176, and parallel to the longitudinal axis A140. Each coupling element 170 forms, with the corresponding matching coupling element 370, a pair of fluidic coupling elements 210. The thermoregulation assembly 200 thus comprises two pairs of coupling elements 210. Initially, as shown in FIGS. 1 and 3, the flange 140 is in the neutral position thereof, which is not necessarily the case at the beginning of each coupling, and each coupling element 170 is in the neutral position thereof.

Ideally, the female body axis A370 is aligned with a corresponding male body axis A170. In practice, there may be a misalignment Δ2, taken parallel to the transverse plane P140, between each female body axis A370 and each corresponding male body axis A170. The misalignment Δ2 at the beginning of the coupling between male body axes A170, if same are in neutral position, and female body axes A370 must be less than or equal to half the maximum clearance J1+J2 of the flange 140 in the receiving housing V120.

A first gap D4 is defined as the minimum distance between the body axes A170 of the two coupling elements 170 on the flange 140, and a second gap D5 as being the minimum distance between the axes of the female body A370 of the matching coupling elements 370 on the plate 300. When the first gap D4 is different from the second gap D5, the thermoregulation assembly 200 has a spacing fault, equal to the absolute value of the difference between the first gap D4 and the second gap D5, that is to say |D4−D5|.

In particular, the tilting of the coupling element(s) 170 inside the flange 140 at a flip angle α makes it possible to compensate for a maximum spacing fault, of the order of 0.2 mm e.g., the spacing fault |D4−D5| having to be less than this maximum spacing fault.

The tubular front part 176 of each coupling element 170 engages into the conical opening 384 of a matching coupling element 370. With the progression of each coupling element 170 inside the conical opening 384, each male body 172 tilts if need be, i.e. the flip angle α changes and takes a non-zero value. The flange 140 also moves, if need be, with respect to the cover 120, in the transverse plane P140 so as to compensate for the misalignment Δ2 and to allow the misalignment |D4−D5| to be taken into account by the tilting of the coupling elements 170. Such double adaptation on the side of the coupling elements 170 allows each male body 172 to come into contact with the slider 280 and push same back toward the retracted opening position thereof, whereas at the same time, each pusher 376 pushes the valve 190 toward the opening position thereof.

In the uncoupled configuration and during coupling, a longitudinal backward movement of the male body 172 inside the flange 140 is limited by the rear longitudinal abutment of the rear surface 184 with the first internal axial surface 163.

When the flange 140 moves with respect to the support 110 and to the cover 120, the first gaskets 166 slide in a leak-tight manner with the front face 112 of the support 110, and the sections delimited by the first gaskets 166 which move without overlapping, even at maximum clearance.

Each male body 172 becomes leak-tight with the corresponding female body 370 at the gasket 381.

The closing continues until the plate 300 reaches a coupled configuration, as shown in FIG. 4, with a longitudinal position with respect to the support 110 wherein the plate 300 is held, by means which are not discussed in detail herein. The thermoregulation assembly 200 is then in a coupled configuration.

In practice, in the coupled configuration, the possible spacing fault |D4−D5| is distributed between the two coupling elements 170, which are then both tilted in the internal orifices 150 thereof with respect to the neutral position thereof, preferentially but not necessarily equally with the same flip angle α.

In the coupled configuration, a fluid can flow through each pair of coupling elements 210 and through the cold plate 300 and the support 110. The transported fluid is water with a pressure of e.g. 5 to 20 bars. The pressure of the flowing fluid pushes back the rear part 178 of the male body 172 in contact with the second internal axial surface 163'.

Figure 5:
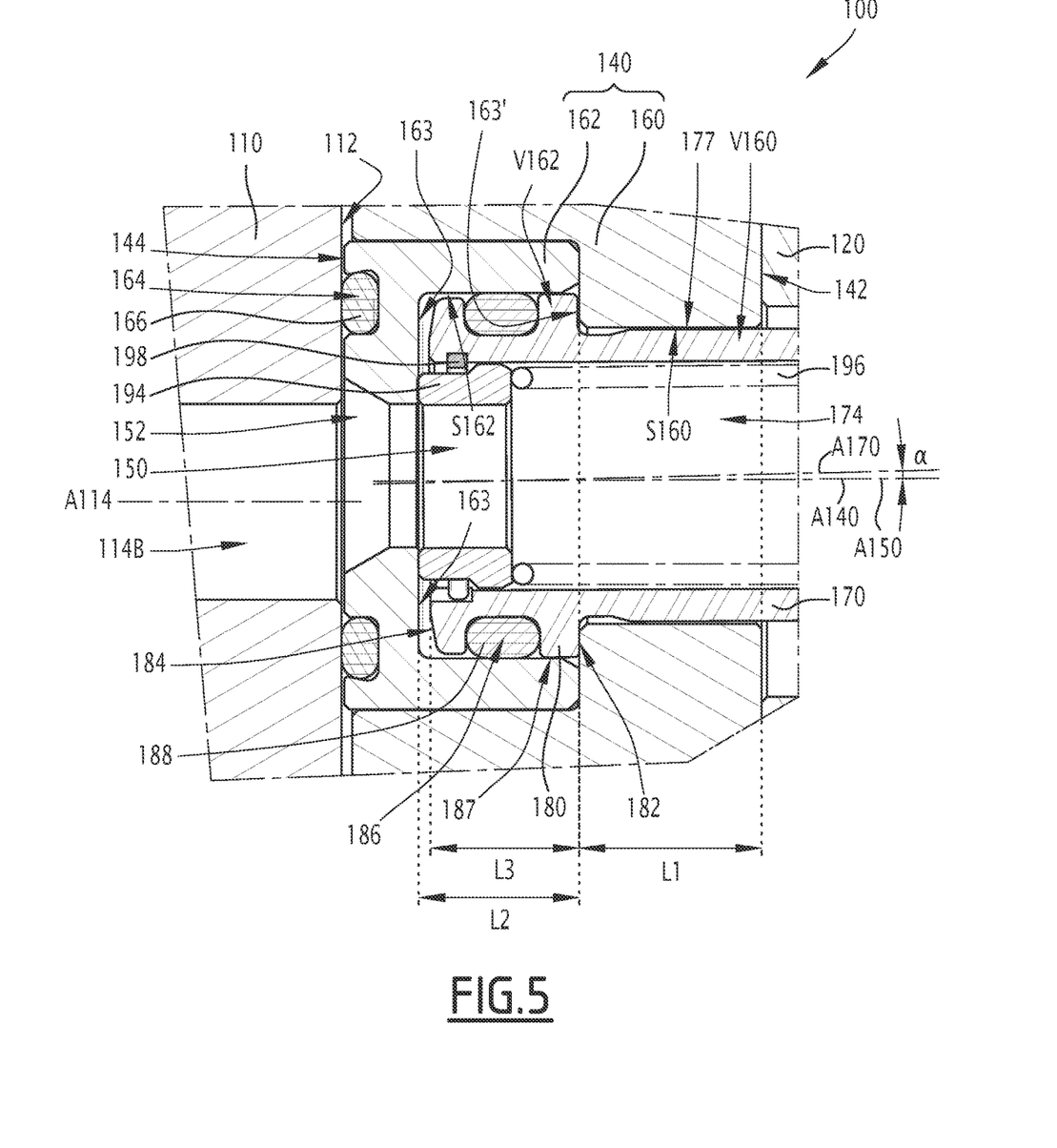
FIG. 5 is a larger-scale view of the detail V shown in FIG. 4.

In the coupled configuration, if the male body 172 has a configuration tilted with respect to the orifice axis A150, the longitudinal distance between the front surface 182 of the external collar 180 and the second internal axial surface 163' is not uniform all around the orifice axis A150. In FIG. 5, in the lower part of the figure, the front surface 182 is in longitudinal contact with the flange 140, whereas, in the upper part of the figure the front surface 182 is detached from the second internal axial surface 163'. In the coupled configuration, the longitudinal distance between the rear surface 184 of the external collar 180 and the first internal axial surface 163 is non-zero but not uniform all around the orifice axis A150.

As an example of use, when the two piping outlets 314A and 314B of the plate 300 are connected to the same internal piping provided in the plate 300, a cooling circuit is created. In such a case, the flow directions in the internal ducts 174 of the two coupling elements 170 of the connection assembly 100 are opposite.

A sequence of uncoupling of the thermoregulation assembly 200 is described below.

Starting from the coupled configuration of the thermoregulation assembly 200, the plate 300 is moved away from the support 110. The valves 190 and sliders 380, pushed by the corresponding springs 196 and 382, each return to the corresponding closing position thereof. The male bodies 172 are released from the female bodies 372.

If, in the coupled configuration of the connection assembly 100, the male bodies 172 had taken up a position tilted with respect to the neutral position thereof, once the connection assembly 100 had been uncoupled, the male bodies 172 having been brought back into the neutral position under the action of the second gaskets 188. The flange 140 remains in the clearance position taken during coupling.

The elastic return of the male bodies 172 to the neutral position makes it possible to reduce the dimension of the conical openings 384 radially to the longitudinal axis A370 thereof.

Figure 6:
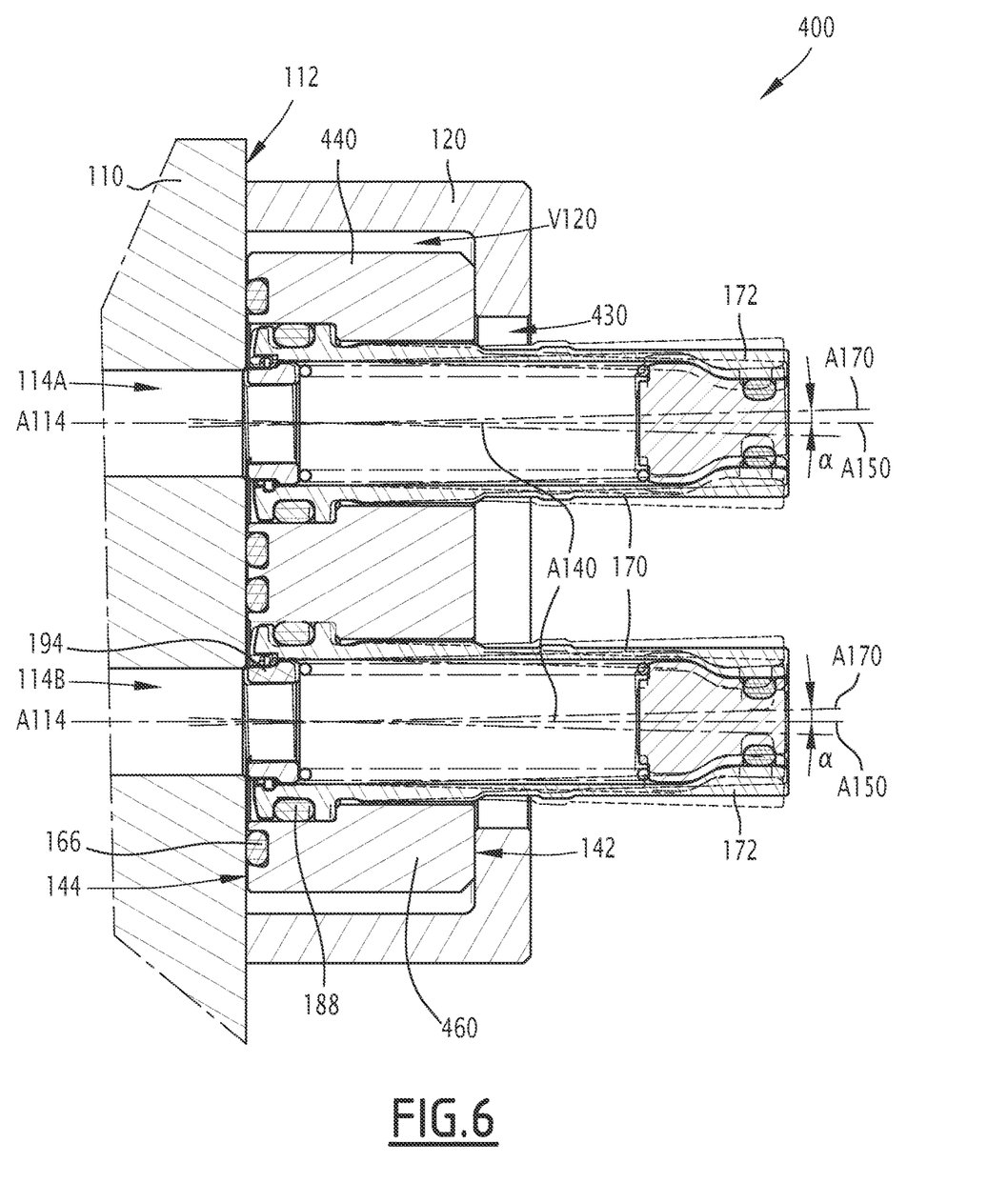
FIG. 6 is a longitudinal section of a connection assembly according to a second embodiment of the invention, shown in an uncoupled configuration.

A connection assembly 400 according to a second embodiment of the invention is shown in FIG. 6. In the second embodiment, elements similar to the elements of the first embodiment have the same references and work in the same way. Hereinafter, the differences between the first and second embodiments are described in the first place.

One of the main differences of the second embodiment compared with the first embodiment is that in the second embodiment, the connection assembly 400 comprises a flange 440 which is made of a single body 460. Each first gasket 166 is housed directly inside the rear surface 144 of the flange 440.

On the other hand, the cover 120 comprises only one opening 430, through which each tubular front part 176 comes out of the connection assembly 400.

The tilting movements of the fluidic coupling elements 170 inside the flange 440 are schematically represented with a thin line, by the profile of the fluidic coupling elements 170 tilted on either side of the neutral position thereof. The neutral position may be slightly misaligned with the corresponding orifice axis A150 when the elasticity of the gasket 188 and/or the valve spring 196 fails to completely overcome the gravity forces of the fluidic coupling element 170. The possibility of tilting of the male bodies 172 is obtained by varying the corresponding flip angle α.

Figure 7:
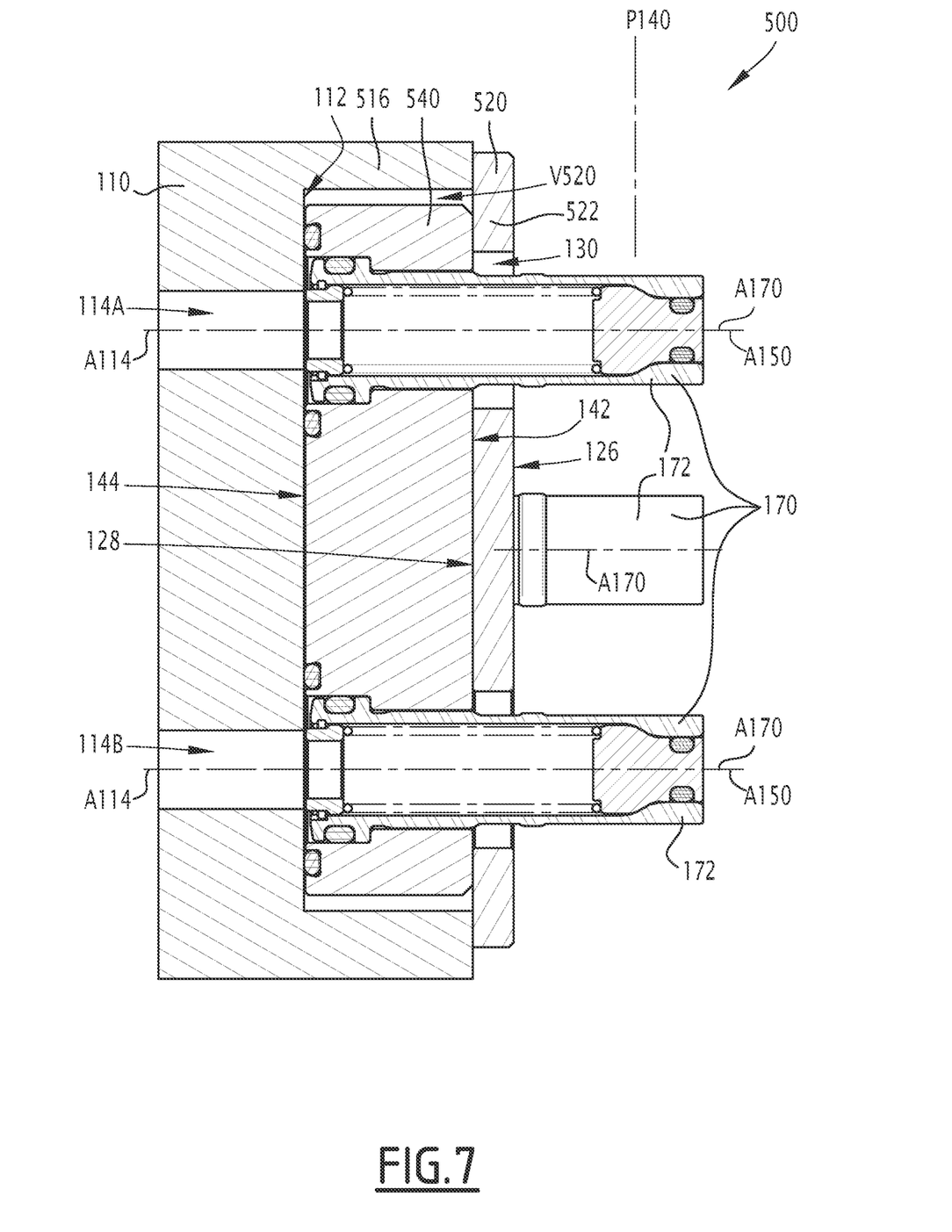
FIG. 7 is a longitudinal section of a connection assembly according to a third embodiment of the invention, shown in an uncoupled configuration.
Figure 8:
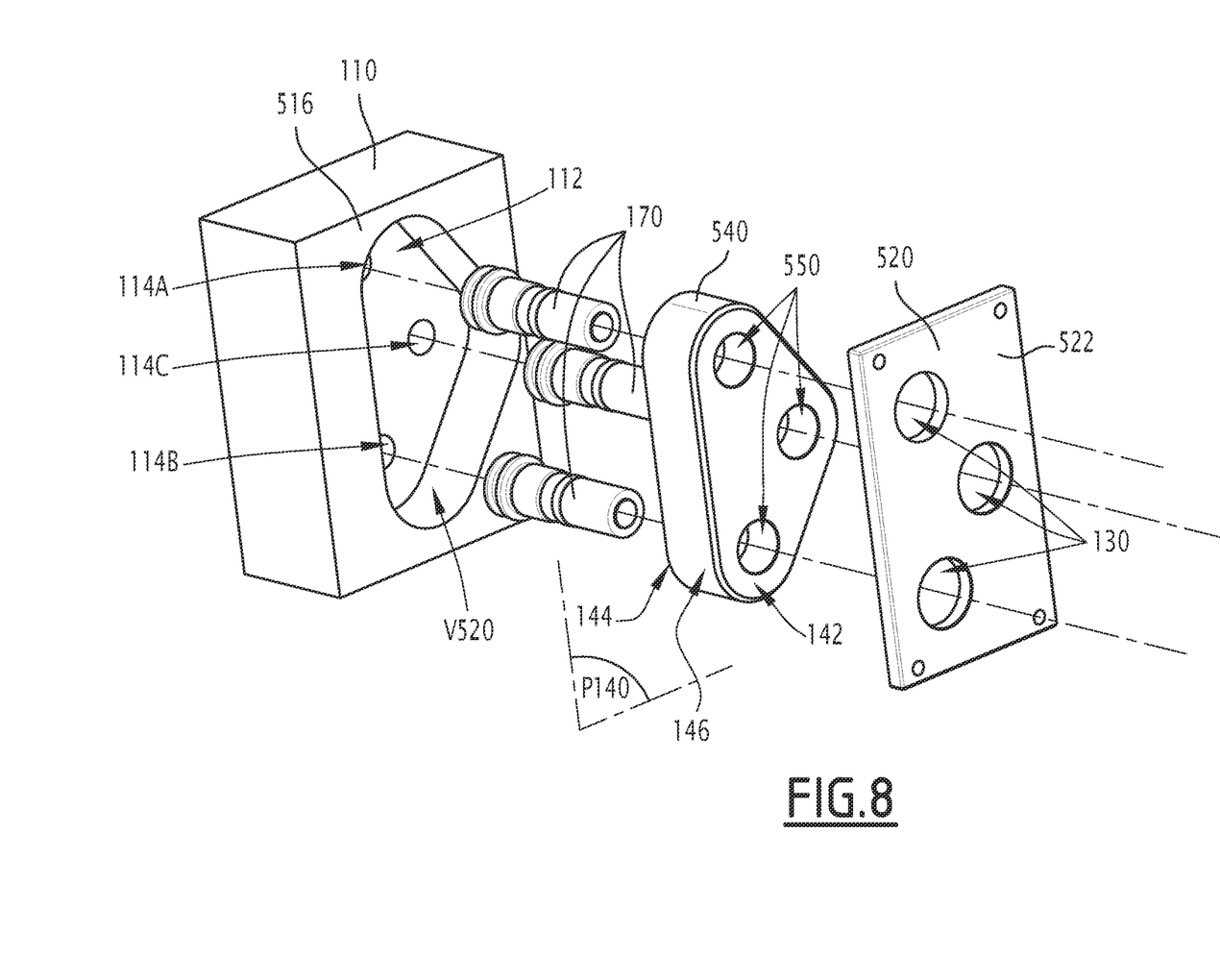
FIG. 8 is a perspective view of an exploded view of the connection assembly of FIG. 7, some elements being omitted so as to make the reading easier.

A connection assembly 500 according to a third embodiment of the invention is shown in FIGS. 7 and 8. The differences of the third embodiment compared with the preceding embodiments are described. The connection assembly 500 comprises a flange 540 made of a single body and wherein three internal orifices 550 are provided, each receiving a male body 172. The three internal orifices 550 are here arranged in a triangle, and the flange 540 has a cross-section that is overall triangular in the transverse plane P140.

The connection assembly 500 is mounted on the support 110, wherein is provided a piping coming out herein via three piping outlets 114A, 114B and 114C. The three piping outlets 114A, 114B and 114C are each arranged opposite a corresponding internal orifice 550 along the front longitudinal direction, and are thus arranged herein in a triangle. The three piping outlets 114A, 114B and 114C come out to the front face 112 of the support 110. The support 110 further comprises a skirt 516 protruding from the front face 112 and surrounding the three piping outlets 114A, 114B and 114C. The connection assembly 500 comprises a cover 520, which is herein reduced to a front wall 522, the cover 520 being attached to the support 110 in a mounted configuration of the connection assembly 500, wherein the cover 520 forms, with the support 110, a receiving housing V520 for the flange 540. The piping outlets 114A, 114B and 114C come out into the receiving housing V520, each piping outlet 114A, 114B and 114C being associated with a corresponding internal orifice 550 of the flange 540.

As in the preceding embodiments, each male body 172 is mounted in the corresponding internal orifice 550 and can be inclined with respect to the corresponding orifice axis A150. In FIG. 7, each male body 172 is shown in the neutral position. Since the flip angle α is zero, it is not referenced in FIG. 7.

In the third embodiment, the three internal orifices 550 are arranged in a triangle and the flange 540 has a substantially triangular cross-section in the transverse plane P140.

In a variant not shown, the three internal orifices are aligned, and the flange then has e.g. an oblong cross-section.

More generally, it will be understood that whatever the number of internal orifices of the flange, the arrangement thereof and the shape of the flange can be adapted, during the design, depending on the applications envisaged.

In the first embodiment, the flange comprises a front body and a plurality of rear bodies, each rear body being associated with a corresponding internal orifice.

In a variant (not shown), the rear bodies form part of the same rear element, which is made in a single piece and which cooperates with the front body in order to form the internal orifices wherein the male bodies are received. The rear element then delimits the rear opening of each of the internal orifices, as well as the rear surface of the flange.

In the embodiments shown, the orifice axes A150 are parallel to the longitudinal axis A140 of the flange 140, 440 or 540.

In a variant (not shown), the orifice axes A150 are tilted by a few degrees with respect to the longitudinal axis A140, the orifice axes A150 remaining parallel to each other. The orifice axes A150 are tilted e.g. at an angle of ±20° with respect to the longitudinal axis A140. In other words, the orifice axes A150 form an angle comprised between 70° and 110° with the transverse plane P140. In all cases, the orifice axes A150 cross through the transverse plane P140.

In a variant (not shown), the gasket interposed radially between the male body 172 and the flange 140, 440, 540 is housed in an internal peripheral groove provided on the flange and being opposite along the radial direction to the longitudinal axis A140 with the external radial surface 187 of the external collar 180. The internal peripheral groove is provided e.g. in the corresponding second internal radial surface S162.

The embodiments and variants mentioned above can be combined with one another so as to generate new embodiments of the invention.

The invention claimed is:

1. A connection assembly configured for being coupled to a plate and comprising:
   a flange crossed through by at least two internal orifices, each of which is centered on an orifice axis, the orifice axes being parallel to each other, the flange comprising a front surface oriented forward in a longitudinal direction parallel to the orifice axes and a rear surface oriented backward, the front and rear surfaces being parallel to a transverse plane, which is transverse to the orifice axes,
   a cover configured for being attached to a support in a mounted configuration of the connection assembly, the support including piping outlets, each piping outlet being associated with a corresponding internal orifice,
wherein:
   in the mounted configuration of the connection assembly, the rear surface of the flange is situated opposite a front face of the support along the longitudinal direction, while the front surface of the flange is situated opposite a rear surface of the cover along the longitudinal direction,
   each internal orifice comprises a rear opening, which comes out to the rear surface of the flange and is in fluidic communication with the corresponding piping outlet,
   the connection assembly further comprises:
      first gaskets, which, in the mounted configuration of the connection assembly, are interposed between the rear surface of the flange and the front face of the opposite support, each first gasket surrounding a corresponding piping outlet and the associated rear opening,
      at least two fluidic coupling elements, each fluidic coupling element comprising a male body crossed by an internal piping therethrough, each male body comprising a tubular front portion and a rear portion,
   each rear portion is received in a corresponding internal orifice of the flange, whereas each tubular front portion extends over the front of the flange through an opening of the cover, each male body being configured for abutting on the front against the flange,
   each tubular front portion is configured for being coupled to a matching fluidic coupling element belonging to the plate,
   the internal piping of each male body is in permanent fluidic communication with the rear opening of the corresponding internal orifice,
   in the mounted configuration of the connection assembly, the flange can be moved with respect to the cover only in a movement supported by the transverse plane,
   for each male body, the connection assembly comprises a second gasket which is interposed radially between each male body and an internal radial surface of the corresponding internal orifice,
   each male body is mounted in the corresponding internal orifice and can be tilted with respect to the corresponding orifice axis.

2. The connection assembly according to claim 1, wherein, in the uncoupled configuration, each male body can be moved in the corresponding internal orifice of the flange along the corresponding orifice axis.

3. The connection assembly according to claim 1, wherein, for each male body, an internal axial surface of the flange which delimits the corresponding internal orifice is opposite the front of a rear surface of the male body.

4. The connection assembly according to claim 1, wherein the rear portion of each male body comprises an external collar protruding from the tubular front part along a radial direction to a central axis of the corresponding male body, and wherein each second gasket is interposed radially between the flange and the corresponding external collar.

5. The connection assembly according to claim 4, wherein the flange comprises at least one rear body and a front body, which are housed one inside the other, the rear body delimiting the rear opening of the internal orifice, the front body delimiting the front surface of the flange, the external collar of the male body being mounted along the orifice axis between the front body and the rear body.

6. The connection assembly according to claim 5, wherein each first gasket is interposed longitudinally between a surface of the rear body delimiting the rear surface of the flange and the support, each first gasket being housed in a corresponding groove provided in the rear body.

7. The connection assembly according to claim 5, wherein each second gasket is interposed radially between an internal radial surface of the internal orifice formed on the rear body of the flange and the external collar, each second gasket being housed in a corresponding external peripheral groove of the external collar.

8. The connection assembly according to claim 5, wherein the flange comprises at least one rear body per fluidic coupling element, each rear body being housed in a corresponding cylindrical cavity provided in the front body of the flange.

9. The connection assembly according to claim 4, wherein the internal orifice comprises a first volume delimited by a first internal radial surface of the flange, partially housing the tubular front part and coming out forward at the front surface of the flange and rearward at a second volume of the internal orifice, the second volume being delimited by a second internal radial surface of the flange and housing the external collar, and
   a length of the first internal radial surface is greater than a length of the second internal radial surface.

10. The connection assembly according to claim 1, wherein each fluidic coupling element comprises:
   a valve which can move inside the internal piping with respect to the male body, a spring, housed in the internal piping and which pushes the valve back into a closing position of the internal piping, wherein the valve is in leak-tight contact with the tubular front portion and closes the internal piping, and an interface ring, received in the internal piping, and in the mounted configuration of the connection assembly, the spring is resting at the rear on the interface ring which itself rests at the rear against the flange.

11. The connection assembly according to claim 1, wherein the rear opening diverges backwards from the orifice axis of the corresponding internal orifice.

12. The connection assembly according to claim 1, wherein, in the mounted configuration of the connection assembly, a minimum distance between two adjacent first gaskets is greater than a maximum clearance of the flange with respect to the cover along a direction parallel to the transverse plane.

13. The connection assembly according to claim 1, wherein, in the uncoupled configuration, each second gasket returns the corresponding male body into a position wherein a central axis of the male body is aligned with the corresponding orifice axis.

14. The connection assembly according to claim 1, wherein the cover comprises:
    a skirt which delimits a receiving housing for the flange radially to the longitudinal direction, and
    a front wall, which comprises at least as many openings as the connection assembly comprises tubular front portions.

15. A thermoregulation assembly, in particular for cooling, comprising:
    the plate and the connection assembly according to claim 1.

* * * * *